United States Patent
Wikierak et al.

(10) Patent No.: US 10,533,118 B2
(45) Date of Patent: Jan. 14, 2020

(54) ROLL OF AN ADHESIVE TAPE HAVING AN ADHESIVE LAYER COMPRISING A STRUCTURAL ADHESIVE AND ITS METHOD OF MANUFACTURE

(71) Applicant: 3M INNOVATIVE PROPERTIES COMPANY, St. Paul, MN (US)

(72) Inventors: Tomasz P. Wikierak, Wroclaw (PL); Pawel M. Malinowski, Wroclaw (PL); Marcin J. Paprocki, Nadarzyn (PL); Elisabeth Cura, Duesseldorf (DE)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 730 days.

(21) Appl. No.: 14/895,327

(22) PCT Filed: Jun. 10, 2014

(86) PCT No.: PCT/US2014/041637
§ 371 (c)(1),
(2) Date: Dec. 2, 2015

(87) PCT Pub. No.: WO2014/200965
PCT Pub. Date: Dec. 18, 2014

(65) Prior Publication Data
US 2016/0108290 A1    Apr. 21, 2016

(30) Foreign Application Priority Data

Jun. 13, 2013  (EP) .................................. 13171874

(51) Int. Cl.
C09J 7/40    (2018.01)
C09J 7/35    (2018.01)
(Continued)

(52) U.S. Cl.
CPC ................. C09J 7/403 (2018.01); C09J 7/10 (2018.01); C09J 7/35 (2018.01); C09J 7/405 (2018.01);
(Continued)

(58) Field of Classification Search
CPC .... B65D 85/67; B65D 85/671; B65D 85/672; B65D 85/676; B65D 85/677;
(Continued)

(56) References Cited

U.S. PATENT DOCUMENTS

| 4,415,615 A | 11/1983 | Esmay et al. |
| 5,333,439 A | 8/1994 | Bozich et al. |

(Continued)

FOREIGN PATENT DOCUMENTS

| EP | 2529856 | 12/2012 |
| JP | H10235277 | 9/1998 |

(Continued)

OTHER PUBLICATIONS

International Search Report for PCT International Application No. PCT/US2014/041637, dated Sep. 1, 2014, 3 pages.

*Primary Examiner* — Scott R. Walshon (57) ABSTRACT

A roll of a double-sided adhesive tape wound around a core, with the tape (10) comprising first (5) and second major adhesive surfaces (4) and at least one adhesive layer comprising a structural adhesive (3) providing the second major adhesive surface (4). The first major adhesive surface (5) is protected by a first liner (1); the second major adhesive surface (4) is protected by a second liner (2), and the second liner (2) extends over the two edges (8, 9) of the second major surface to cover at least part of each first and second minor surfaces (6, 7) of the tape (10).

20 Claims, 7 Drawing Sheets

(51) Int. Cl.
*C09J 7/10* (2018.01)
*C09J 163/00* (2006.01)

(52) U.S. Cl.
CPC ....... *C09J 163/00* (2013.01); *C09J 2201/128* (2013.01); *C09J 2201/61* (2013.01); *C09J 2401/005* (2013.01); *C09J 2463/00* (2013.01); *C09J 2467/005* (2013.01); *C09J 2477/005* (2013.01)

(58) Field of Classification Search
CPC .............. C09J 2201/128; C09J 2201/61; C09J 2401/005; C09J 2467/005; C09J 2477/005; C09J 7/10; C09J 7/35; C09J 7/405
USPC ............................................... 428/40.1, 40.8
See application file for complete search history.

(56) References Cited

U.S. PATENT DOCUMENTS

| | | | |
|---|---|---|---|
| 5,392,592 A | 2/1995 | Bozich et al. | |
| 5,848,696 A * | 12/1998 | Christ | B65B 9/067 206/447 |
| 6,821,594 B2 * | 11/2004 | Watanabe | B32B 27/06 206/204 |
| 8,409,683 B2 * | 4/2013 | Kosaka | C09J 7/38 428/40.1 |
| 8,535,473 B2 * | 9/2013 | Dietz | C09J 7/35 156/275.5 |
| 2003/0183326 A1 | 10/2003 | O'Connor | |
| 2008/0220194 A1 * | 9/2008 | Burnham | C09J 7/10 428/41.8 |
| 2009/0258176 A1 * | 10/2009 | Muta | B32B 27/08 428/41.5 |
| 2012/0064810 A1 | 3/2012 | Yamamoto et al. | |

FOREIGN PATENT DOCUMENTS

| | | |
|---|---|---|
| JP | 2005330388 | 12/2005 |
| WO | WO 98/23488 | 6/1998 |
| WO | WO 99/61321 | 12/1999 |
| WO | WO 2012/019938 | 2/2012 |

* cited by examiner

ROLL OF AN ADHESIVE TAPE HAVING AN ADHESIVE LAYER COMPRISING A STRUCTURAL ADHESIVE AND ITS METHOD OF MANUFACTURE

CROSS REFERENCE TO RELATED APPLICATIONS

This application is a national stage filing under 35 U.S.C. 371 of PCT/US2014/041637, filed Jun. 10, 2014, which claims priority to European Application No. 13171874.4, filed Jun. 13, 2013, the disclosures of which are incorporated by reference in their entireties herein.

FIELD OF THE INVENTION

The invention relates to a roll of a double-sided adhesive tape comprising at least one adhesive layer with a structural adhesive. The invention also relates to a method of making a roll of such an adhesive tape.

BACKGROUND OF THE INVENTION

In the transportation sector there is an increasing trend to reduce the weight of vehicles. This trend is for example leading to the use of double-sided structural adhesive tapes including tapes with a single structural adhesive layer (so-called transfer tapes) where they have previously not been used or to the application of tapes in new configurations that are more demanding and result, for example, in higher stress-strain forces to which the adhesive tape may be subjected. Double-sided adhesive tapes have a first and second major adhesive surface, respectively. They also have a first and second minor side extending perpendicular to the first and second major surface. Between each of the surfaces an edge forms the transition from one surface to the other.

Structural adhesives comprise cross-linkable but not yet cross-linked adhesive which may suffer from the so-called cold flow effect, i.e. the adhesive creeps on a surface it is attached thereby deteriorating its original shape and oozing. This effect is particularly pronounced when an adhesive tape having at least one adhesive layer comprising a structural adhesive is wound into a roll.

U.S. Pat. No. 4,415,615 discloses adhesives tapes used to bond two substrates together to form a bonded composite. Such adhesive tapes are used, for example, in the automotive industry where they may be employed to bond various components to the body of a car or other motor vehicles. Typically they are used to bond such parts as emblems, plastic parts as well as rubber gaskets to doors.

Patent application WO 98/23488 discloses an elongate mass of cold-flowable material and a liner in which the liner is wrapped around the material with the liner inside surface facing the peripheral surface of the material with first and second regions of the liner extending away from the material. The cold-flowable material comprises a hot-melt pressure sensitive adhesive and the liner is a polyethylene liner that also comprises silicone.

Patent application WO 98/23488 discloses a method of enclosing a mass of cold-flowable material with a liner. The method comprises the steps of: contacting a central region of an inside surface of an elongate liner with portion of the outer peripheral surface of an elongate mass of material, bringing the first and second regions of the liner together to enclosed the mass of material with the liner and arranging the wrapped material on the core.

Patent application EP 2,529,856 discloses a method of joining two metal panels with an adhesive sheet which comprises a thermosettable composition. The method comprises the steps of: providing an adhesive sheet material near an end of the metal panels and adhering the metal panels together such that the adhesive sheet is between the metal panels thereby forming a metal joint and heating the metal joint.

It is desirable to provide a roll of an adhesive tape comprising at least one layer of a structural adhesive suitable for use in the automotive market that exhibit less cold flow than such rolls disclosed in the art and preferably essentially no cold flow.

SUMMARY OF THE INVENTION

The present invention provides a roll of a double-sided adhesive tape wound around a core, with the tape comprising first and second major adhesive surfaces and at least one adhesive layer comprising a structural adhesive providing the second major adhesive surface. The first major adhesive surface is protected by a first liner, the second major adhesive surface is protected by a second liner, and the second liner extends over the two edges of the second major surface to cover at least part of each first and second minor surfaces of the tape.

Preferably, the adhesive tape consists of the adhesive layer comprising a structural adhesive, providing the first and second major adhesive surface.

Preferably, the second liner covers each the first and second minor surfaces of the adhesive layer comprising the structural adhesive.

Preferably, the second liner extends beyond the ends of each of the first and second minor surfaces of the tape and is folded onto the first liner.

Preferably, the adhesive tape is level-wound around the core in essentially helical convolutions.

Preferably, the adhesive tape is wound around the core into a planetary roll.

Preferably, the tape on the roll with the first and second liner has length of at least 200 m.

Preferably, the first liner has a width not exceeding the width of the first major adhesive surface.

Preferably, the first liner is non-stretchable.

Preferably, the first liner is made of paper, polyester and/or polyamide.

Preferably, the second liner is stretchable.

Preferably, the second liner is a thermoplastic film with a thickness below 30 μm and/or a brittle transition temperature below 40° C.

Preferably, the second liner comprises one or more polymers selected from a group comprising low density polyethylene (LDPE), linear low density polyethylene (LLDPE), ultra low density polyethylene (ULDPE), enhanced polyethylene resin (EPE), polyvinyl chloride (PVC), ethylene-vinyl acetate copolymer (EVA), stretched polyethylene, oriented polypropylene films, ethylene/acid copolymer (EAA), poly(ethylene-vinylalcohol), and/or copolymers of ethylene with minor amounts of at least one C4 to C10 alpha-olefin co-monomer.

Preferably, the second liner has density between 0.90-0.94 g/cm$^3$.

Preferably, the second liner has the melt flow rate not greater than 6 g/10 min.

Preferably, the second liner has the tensile strength at break greater than 20 MPA.

Preferably, the second liner has a surface free energy below 40 mN/m at 20° C.

Preferably, the structural adhesive comprises a thermosettable adhesive comprising at least one thermally activatable epoxy compound and at least one epoxy curing agent.

Preferably, the tape has a shelf-life time of at least 6 month.

Present invention provide a method of making a roll of a double-sided adhesive tape comprising first and second major adhesive surfaces and at least one adhesive layer comprising a structural adhesive providing the second major adhesive surface, the method comprising the steps of:
- providing the adhesive tape,
- attaching a first liner to the first major surface of the tape,
- attaching a second liner to the second major surface and at least part of each first and second minor surfaces of the tape and
- winding the tape around a core.

Preferably, the tape is level-wound in essentially helical convolutions around the core by laterally moving the core.

DETAILED DESCRIPTION

The present invention provides a roll of a double-sided adhesive tape having at least one adhesive layer comprising a structural adhesive. The adhesive tape preferably is a single-layer adhesive film and consists of the adhesive layer comprising a structural adhesive. In such instance, the adhesive tape is also referred to as adhesive film (sometimes also referred to as transfer tape). The adhesive tape can also have other constructions and comprise, for example, a backing or mesh bearing on one or on each side an adhesive layer wherein at least one of these layers comprises a structural adhesive.

The adhesive tape has first and second exposed major adhesive surfaces. The second major surface is a major surface of the adhesive layer comprising the structural adhesive. The adhesive tape also has a first and second minor side extending perpendicular to the first and second major surface. Between each of the surfaces an edge forms the transition from one surface to the other.

In case of a single-layered adhesive film or transfer tape both first and second major surfaces as well as the first and second minor surfaces are provided by the single layer of adhesive comprising a structural adhesive. In case of adhesive tapes comprising more than one adhesive layer at least the second major adhesive surface is provided by the at least one adhesive layer comprising a structural adhesive. The first major adhesive surface may comprise, for example, an adhesive layer that does not comprise a structural adhesive or an adhesive layer that comprises a structural adhesive.

Preferably the adhesive tape has a width of between 5 and 30 mm and a thickness of between 100 µm and 1000 µm.

The first and second major surfaces of the adhesive tape of the present invention are protected by a first and second liner, respectively. The liners are removed when applying the adhesive tape for bonding. Above and below, the term adhesive tape is used both for the adhesive tape with exposed first and second major adhesive surfaces, i.e. for adhesive tapes with removed liners, and for adhesive tapes where the first and/or the second major surfaces are covered with release liners, respectively.

The first liner protects the first major surface and has essentially the same width as the first major surface. The width of the first liner preferably is at least 0.9 of the width of the first major adhesive surface and, in particular, at least 0.95 of the width of the first major adhesive surface. The first liner has a width that preferably does not exceed the width of the first major adhesive surface. In one embodiment the first liner exceeds the width of the first major surface of the structural adhesive tape.

In case of a single-layered tape comprising a structural adhesive the width of the first liner preferably essentially corresponds to the width of the tape. The first liner preferably is non-stretchable thereby increasing the rigidity and thus the handleability of the tape. The first liner is preferably made from polyester, paper and/or polyamide. The surface of the first liner facing and being attached to the first major adhesive surface can be siliconized or treated otherwise to decrease the adhesion between the liner and the first major adhesive surface.

The second liner protects the second major surface of the tape. The second liner extends over the two edges of the second major surface to cover at least part of each first and second minor surfaces of the adhesive tape. In a preferred embodiment the second liner is covering completely both the second major adhesive surface and the two minor surfaces of the adhesive tape. The second liner may as well extend beyond the ends of the two minor surfaces and may be wrapped onto and partly also covers the first liner. The second liner may also be folded outside away from the first liner. The second liner may thus preferably have a width of at least the width of the second major surface plus twice the width of the two minor surfaces so that it can be wrapped around the second major adhesive surface. The second liner may be attached essentially symmetrical relative to the second major adhesive surface, i.e., the second liner preferably extends with essentially the same width over the two opposing edges of the second major adhesive surface. In case of a one-layered adhesive film (transfer tape) the width of the second liner is preferably essentially at least the sum of the width of the transfer tape plus at least twice the thickness of the transfer tape.

In another preferred embodiment the second liner extends beyond at least one end of the minor surfaces of the tape and is wrapped around the corresponding edge of the first liner. Especially preferred is an embodiment where the second liner extends beyond the ends of both minor surfaces and is wrapped around both ends of the first liner.

It was found that when winding the adhesive tape with its first and second major surfaces around a core into a roll of the present invention the tape exhibits upon unwinding essentially the same shape as the tape before it was wound into the roll, i.e. the adhesive tape exhibits a low cold flow and oozing. This finding was made for example at room temperature. This property is highly advantageous and allows for using the adhesive tape in demanding applications in the automotive industry. It further allows to store the tape at room temperature.

The advantageous properties of the roll of the adhesive tape of the present invention and in particular, the low cold flow and oozing characteristics exhibited by the adhesive tape upon unwinding from the roll can be further enhanced by selecting the second liner so that it exhibits at least one of the preferred properties summarized in Table 1 below. Especially preferred are embodiments of the second liner that cumulatively exhibit all properties in the ranges specified in Table 1. Methods for measuring the properties specified in Table 1 are specified in the Example section below.

TABLE 1

| Properties | Preferred range | |
|---|---|---|
| Thickness of 2nd liner | 15-30 | μm |
| Brittle transition temperature | −40−−90 | ° C. |
| Product Density | 0.9-0.94 | g/cm$^3$ |
| Melt Flow Rate Index; 190 C., 2.16 kg | 0.5-7.5 | g/10 min |
| Tensile Strength at break | 20-55 | MPA |

The most preferred ranges of the second liner is a thickness of 22 μm, a brittle transition temperature of −50° C., a density of 0,918 g/cm$^3$, a melt flow rate index of 2.5 g/10 min and a tensile strength at break of 35 MPA.

The second liner is preferably made from low density polyethylene (LDPE), linear low density polyethylene (LLDPE), ultra low density polyethylene (ULDPE), enhanced polyethylene resin (EPE), polyvinyl chloride (PVC), ethylene-vinyl acetate copolymer (EVA), stretched polyethylene, oriented polypropylene films, ethylene/acid copolymer (EAA), ethylene-vinylalcohol (EVOH), and/or copolymers obtainable by polymerizing ethylene monomers with a minor amount of at least one C4 to C10 alpha-olefin co-monomer such as octane-1, hexane-1, butane-1, etc. The surface of the second liner facing and being attached to the second major adhesive surface can be siliconized or treated otherwise to decrease the adhesion between the second liner and the second major adhesive surface.

The structural adhesive comprises a thermosettable adhesive preferably comprising at least one thermally activatable epoxy compound and at least one epoxy curing agent. The term structural adhesive as used above and below means an adhesive that is thermosettable, i.e. can be cross-linked upon exposure to thermal energy. The structural adhesive comprises at least one compound comprising a cross-linkable structural element such as an ethylene group and/or an epoxy group, and at least one thermally activatable curing agent. If desirable, the structural adhesive may comprise further components such as, for example, a non-thermosettable thermoplastic resin.

The structural adhesive used in the present invention preferably is a pressure-sensitive adhesive.

The at least one epoxy compound can be preferably selected from a group of materials comprising bisphenol A, bisphenol E, bisphenol S, aliphatic and aromatic amines and halogen substituted bisphenol resin, novolacs, aliphatic epoxies and combination thereof and/or there between. The at least one epoxy compound preferably has an average equivalent weight of between 100 g/equivalent and 230 g/equivalent.

The thermoplastic resin can preferably be selected from a group consisting of polyether thermoplastic resins, polypropylene thermoplastic resin, polyvinyl chloride thermoplastic resin, polyester thermoplastic resin, polycaprolactone thermoplastic resin, polystyrene thermoplastic resin, polycarbonate thermoplastic resins, polyamide thermoplastic resins, and any combinations of mixture thereof. The at least one thermoplastic resin is preferably selected as to exhibit a softening point between 60° C. and 140° C. Any thermoactivatable epoxy curing agent can include polyamines, mercaptans, phenols, encapsulated amines, Lewis acids salts, transition metal complex, a group consisting of amines, acid anhydrides, guainidenes, dicyandiamide and/or mixtures thereof.

Optionally a structural adhesive film can comprise at least one toughening agent, at least one blowing agent or both.

It was found that when winding the adhesive tape with its first and second major adhesive surfaces around a core into a roll of the present invention the tape exhibits upon unwinding essentially the same shape as the tape before it was wound into the roll.

The roll of the adhesive tape of the present invention has a long shelf life time, that means that the tape when unwound from the roll upon a prolonged storage time exhibits an essentially undeformed shape relative to the original shape the tape had prior to being wound up into a roll. The shelf life time of the roll of adhesive tape of the present invention at a temperature of less than about 30° C. preferably is at least 6 months. The roll of the adhesive tape of the present invention also provides an excellent shelf life time at elevated temperatures that are at least 10° C. lower than the activation temperature of the thermal curing agent.

The roll of adhesive tape of the present invention is thus suitable for use in demanding applications particularly for joining metal and/or hybrid parts in the automotive industry and allows to store the tape at room temperature.

The stability of the roll of adhesive tape of the present invention can be described in terms of the cold flow behavior of the adhesive tape. The cold flow behavior of an adhesive tape observed after winding the tape into a roll and unwinding it again from the roll, can be assessed qualitatively and quantitatively as is described in the test method section below.

The adhesive tapes of the present invention preferably exhibit a cold flow CF of less than +/−5% and more preferably of less than +/−3% as measured according to the test method described below.

The adhesive tape of the present invention can be wound up around a core, for example, into a planetary roll or a level-wound roll. In a planetary roll subsequent layers of the tape are arranged essentially congruent to each other. In a level-wound roll the adhesive tape is wound in essentially helical convolutions around the core, for example, by laterally moving the core during the winding process. The core preferably has a diameter of at least 3 inches, the width preferably is between: 90-500 mm. The adhesive tape is moved in a first direction along the longitudinal axis of the core, before, at the appropriate time, its direction of movement is reversed into the opposite second direction along the core and so on thereby building a roll comprising a multitude of layers of adhesive tape. The diameter of the finished roll preferably is maximum: 400 mm so that the roll can be handled easily. The adhesive tape may be wound onto the core into a continuous length of 500 m. It is also possible o have rolls with a tape having a continuous length of 100 m, 200 m, 300 m, 400 m or even more than 500 m. The continuous length of the tape on the roll depends on the requirements of the customer. Level-would rolls may be preferred over planetary rolls because they have a higher capacity for very long lengths in a small final diameter.

The present invention provides a method of making a roll of an adhesive tape having first and second major adhesive surfaces and comprising at least one adhesive layer comprising a structural adhesive providing the second major adhesive surface, the method comprising the steps of:
providing the adhesive tape,
attaching a first liner to the first major surface of the tape,
attaching a second liner to the second major surface and at least part of each first and second minor surfaces of the tape and
winding the tape around a core.

In a preferred embodiment, the present invention relates to a method of making a roll of an adhesive tape, comprising at least one of the following steps and parameters. The steps may also appear in another order, respectively:

a. An adhesive tape having first and second major surfaces is provided wherein the second major adhesive surface is provided with an adhesive layer comprising a structural adhesive. The first major adhesive surface is covered by a first liner. The adhesive tape is wound into a roll so that the second major adhesive surface is adhering to the back surface of the first liner which also has release properties. The adhesive tape is then unwound from the roll using a powered unwinding mechanism for unwinding at an unwind tension control of 1-10 N. The tension control is adjusted by a load cell, providing peel off roll with adjustable contact pressure.

b. The line speed for the tape is selected to be up to 200 meter per minute.

c. A slitting mechanism is provided comprising a shear cut cassette adapted to receive strips of the adhesive tape that are cut to the desired width from the adhesive roll. The cutting width tolerance preferably is less than ±0.25 mm.

d. A roll of a second liner is provided. The second liner is unwound by means of a powered unwinding mechanism for unwinding, providing an unwind tension control 1-10 N. The tension control is adjusted by a load cell providing a peel off roll with an adjustable contact.

e. The second liner is laminated to the second major adhesive surface of the strips of the tape at a lamination station comprising lamination rolls that are pneumatically actuated. The strips of the adhesive tape are fed into the lamination station by means of a grooved roll with maximum 4 mm wall distance. The lamination is performed with a pressure between 30 N and 180 N which is provided by lamination rolls. The rolls may pneumatically activated. The lamination is made with a cold roll laminator, which is the preferred solution for a product according to the invention.

f. The second liner is cut to its desired width using a slitting mechanism comprising a shear cut cassette adapted to receive the tape strips with the first liner and cutting the second liner, providing a cutting width maximum tolerance of ±0.25 mm.

g. The portions of the second liner extending beyond the edges of the second major adhesive surface are laminated to the two minor surfaces of the adhesive tape. In a preferred embodiment the second liner has end portions extending beyond the ends of the two minor surfaces. Such end portions are bent inwardly towards the first liner and wrapped around and the first liner, thereby reducing the possibility of edge damage. Lamination of the second liner onto the two minor surfaces.

h. The adhesive tape bearing first and second liners is then preferably level-wound into a roll using a powered traverse winding mechanism for winding the adhesive tape onto a core. The adhesive tape having a typical width of between 5 mm and 30 mm is traversed across the face of the core. The core preferably has a diameter of at least 5 inches, and its width is preferably between: 90-500 mm. At the appropriate time during the winding process, the direction of the tape is reversed so that the tape traverses in the opposite direction, thus building up a number of layers until a finished roll is created. The finished roll preferably has the following parameters:
a diameter of up to 400 mm
a continuous long length of at least 500 m
an unwind tension control 1-10 N
each layer of the adhesive tape having first and second liners laminated thereon, preferably underlaps the preceding tape layer but leaves a gap between them preferable having a size of between 500 μm-3000 μm; this arrangement reduces the possibility of edge damage and provides a traverse pitch from 5 to 31 mm.

In another preferred embodiment the second liner is stretched and then laminated to the second major adhesive surface of the strips of the tape at a lamination station. The lamination station may comprise lamination rolls.

Herein below various embodiments of the present invention are described and shown in the drawings wherein like elements are provided with the same reference numbers.

The invention will now be described in more detail with reference to the Figures exemplifying particular embodiments of the invention.

Figure 1:
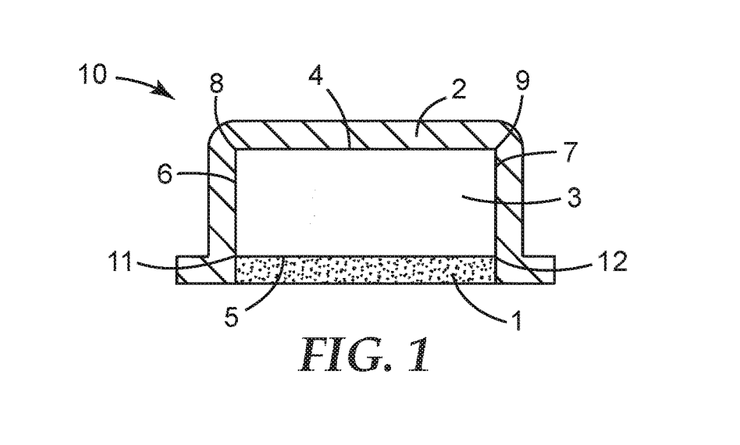
FIG. 1 is a cross-sectional view of an adhesive tape consisting of a single adhesive layer comprising a structural adhesive which is protected by two liners.

FIG. 1 illustrates a single-layered adhesive film 3 having a first major adhesive surface 5 and a second major adhesive surface 4. The adhesive film 3 also comprises a first minor adhesive surface 6 and a second minor adhesive surface 7. The adhesive film 3 further comprise edges 8 and 9 between the second major surface 4 and the first and second minor adhesive surfaces 6 and 7. The first and second minor adhesive surfaces 6 and 7 extend down to their ends 11 and 12, which are located at the two edges of the first major adhesive surface. The adhesive film 3 comprises a structural adhesive. The first major adhesive surface 5 of the adhesive is covered in its full width by a first liner 1. The second major adhesive surface 4 of the adhesive film 3, the edges 8 and 9 and its two minor surfaces 6 and 7 are completely covered by a second liner 2. The second liner 2 is bent outwardly at its end so that the outwardly projecting portion of the second liner 2 is flush with the first liner 1. All four edges 8, 9, 11 and 12 of the structural adhesive film 3 are thus fully protected.

Figure 2:
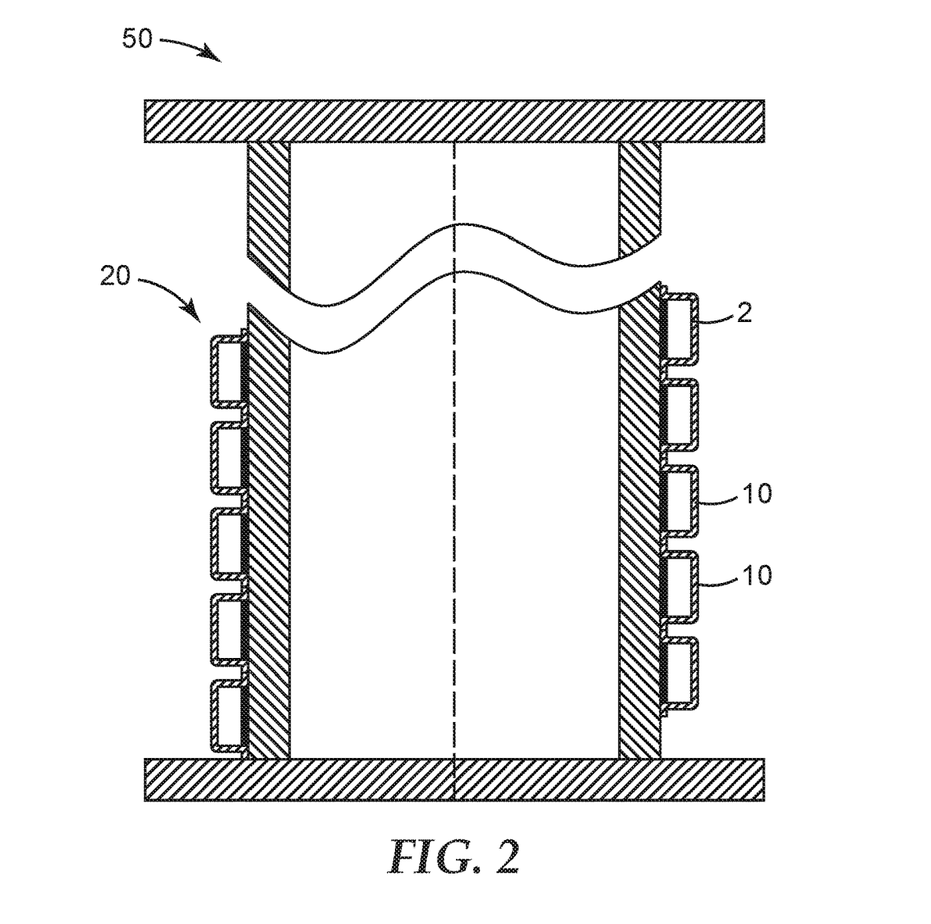
FIGS. 2 and 3 are cross-sectional views of the adhesive tape of FIG. 1 level-wound into a roll.

FIG. 2 is a cross sectional view of the adhesive film 3 with attached first and second liners 1, 2 as shown in FIG. 1 level-wound onto a core 51 to provide a roll 50. FIG. 2 only shows the first layer 20 of the adhesive tape 3 with liners 1, 2 attached to it that is wound to the core 51. The adhesive film 3 bearing liners 1, 2 are arranged on opposite sides of the cross-sectional view in a staggered fashion. The outwardly facing portions of the second liner of neighbouring adhesive films 3 bearing liners 1, 2 are essentially abutting each other.

Figure 3:
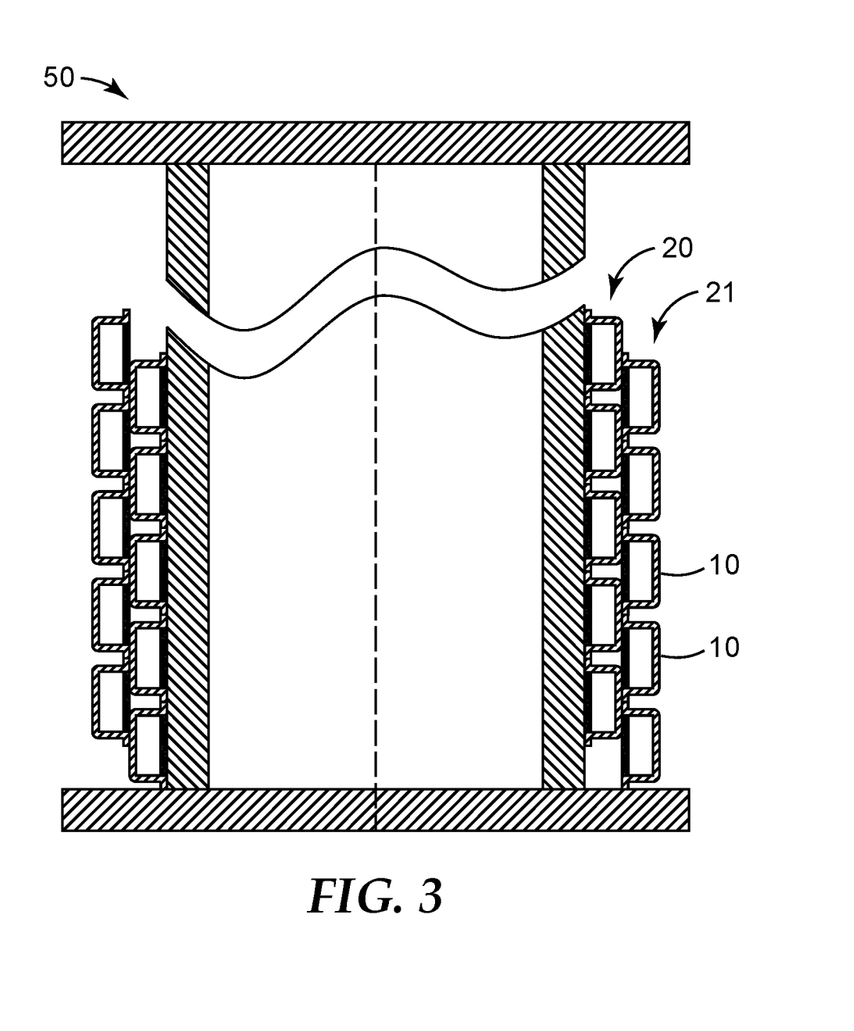

The cross-sectional view of FIG. 3 is similar to that of FIG. 2. It differs from FIG. 2 only in that a second layer 21 of the adhesive film 3 with liners 1, 2 is level-wound onto the first layer 20.

Figure 4:
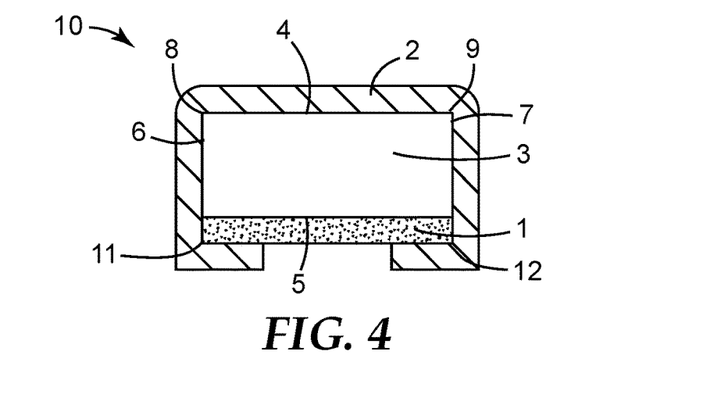
FIG. 4 is a cross-sectional view of another embodiment of an adhesive tape consisting of a single adhesive layer comprising a structural adhesive which is protected by two liners.

FIG. 4 shows another embodiment of a single-layered adhesive film 3 with two liners 1, 2 being attached to it. The adhesive film 3 also comprises a first minor adhesive surface 6 and a second minor adhesive surface 7. The adhesive film 3 further comprises edges 8 and 9 between the second major surface 4 and the first and second minor adhesive surface 6 and 7. The first and second minor adhesive surface 6 and 7 extend between the first and second major adhesive surface. The first major adhesive surface 5 of the film 3 is covered in its full width by the first liner 1. The second liner 2 fully covers the second major adhesive surface 4, the two minor adhesive surfaces 6, 7 and has furthermore two end portions extending beyond the ends of the minor adhesive surfaces 6, 7 and their ends 11 and 12 which are located at the two edges of the first major adhesive surface. These end portions are bent inwardly onto the exposed surface of the first liner 1.

Figure 5:
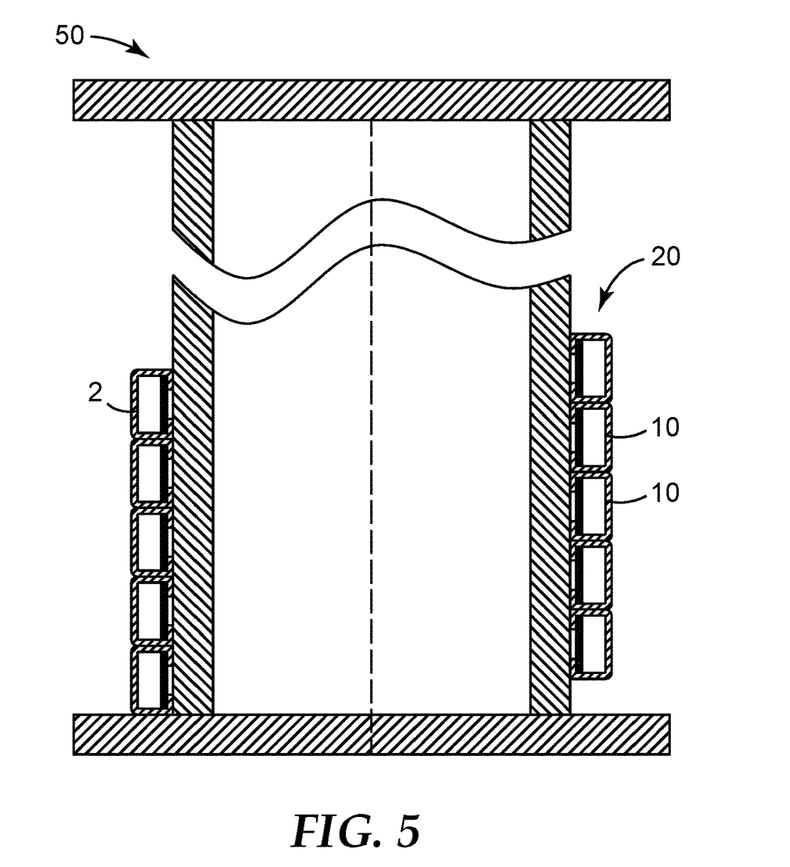
FIGS. 5 and 6 are cross-sectional views of the adhesive tape of FIG. 4 level-wound into a roll.

FIG. 5 is a cross sectional view of the adhesive film 3 with attached first and second liners 1,2 as shown in FIG. 4 being level-wound onto a core 51 to provide a roll 50. FIG. 5 only shows the first layer 20 of the adhesive tape 3 with liners 1, 2 attached to it that is wound to the core 51. The adhesive film 3 bearing liners 1, 2 are arranged on opposite sides of the cross-sectional view in a staggered fashion. The adhesive film 3 bearing liners 1, 2 are arranged so that the second liner arranged on the minor adhesive surfaces of neighbouring tape windings are essentially abutting each other.

Figure 6:
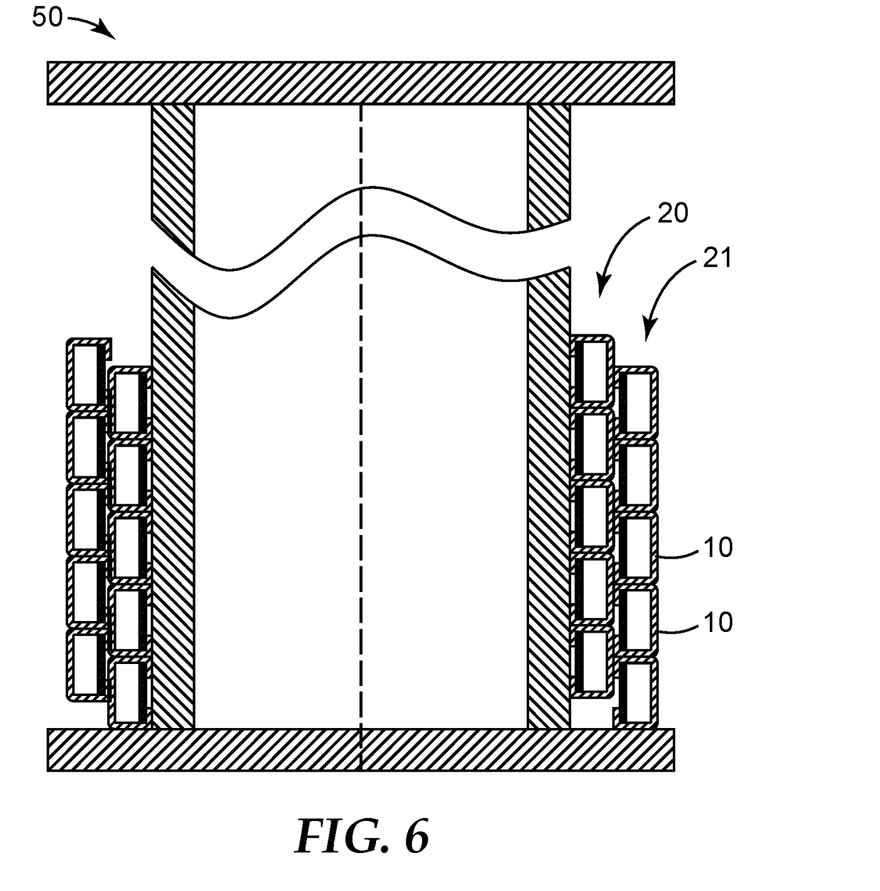

The cross-sectional view of FIG. 6 is similar to that of FIG. 5. It differs from FIG. 5 only in that a second layer 21 of the adhesive tape 3 with liners 1, 2 is level-wound onto the first layer 20.

Figure 7:
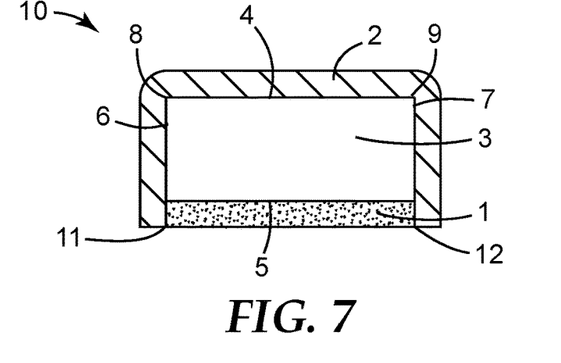
FIG. 7 is a cross-sectional view of another embodiment of an adhesive tape consisting of a single adhesive layer comprising a structural adhesive which is protected by two liners.

FIG. 7 shows another embodiment of a single-layered adhesive film 3 with two liners 1, 2 being attached to it. The adhesive film 3 also comprises a first minor adhesive surface 6 and a second minor adhesive surface 7. The adhesive film 3 further comprises edges 8 and 9 between the second major surface 4 and the first and second minor adhesive surface 6 and 7. The first and second minor adhesive surface 6 and 7 extend down. The first major adhesive surface 5 of the film 3 is covered in its full width by the first liner 1. The second liner 2 fully covers the second major adhesive surface 4, the two minor adhesive surfaces 6, 7 and their ends 11 and 12 which are located at the two edges of the first major adhesive surface.

Figure 8:
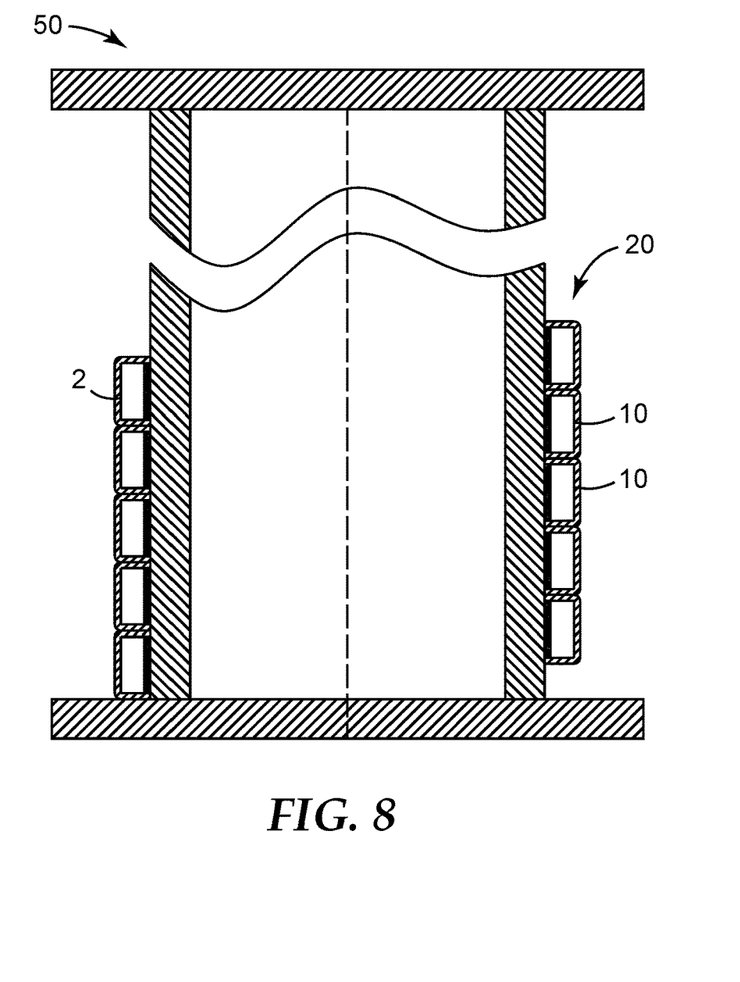
FIGS. 8 and 9 are cross-sectional view of the adhesive tape of FIG. 7 level-wound into a roll.

FIG. 8 is a cross sectional view of the adhesive film 3 with attached first and second liners 1, 2 as shown in FIG. 7 being level-wound onto a core 51 to provide a roll 50. FIG. 8 only shows the first layer 20 of the adhesive tape 3 with liners 1, 2 wound to the core 51.

Figure 9:
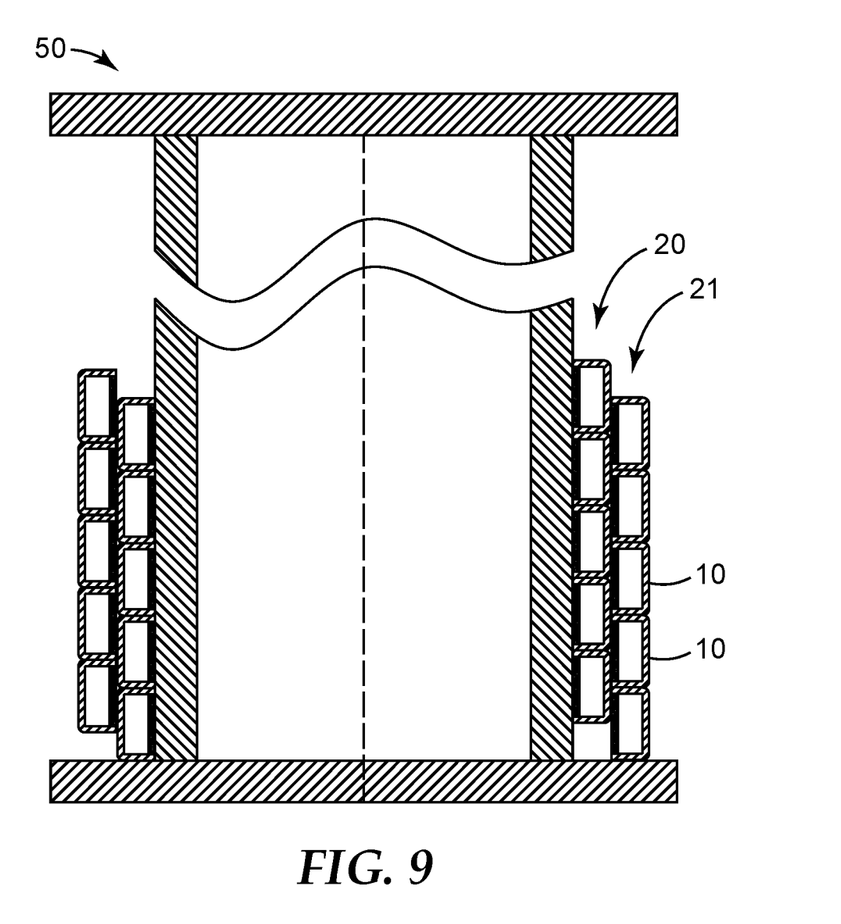

The cross-sectional view of FIG. 9 is similar to that of FIG. 8. It differs from FIG. 8 only in that a second layer 21 of the adhesive tape 3 with liners 1, 2 is level-wound onto the first layer 20.

Figure 10:
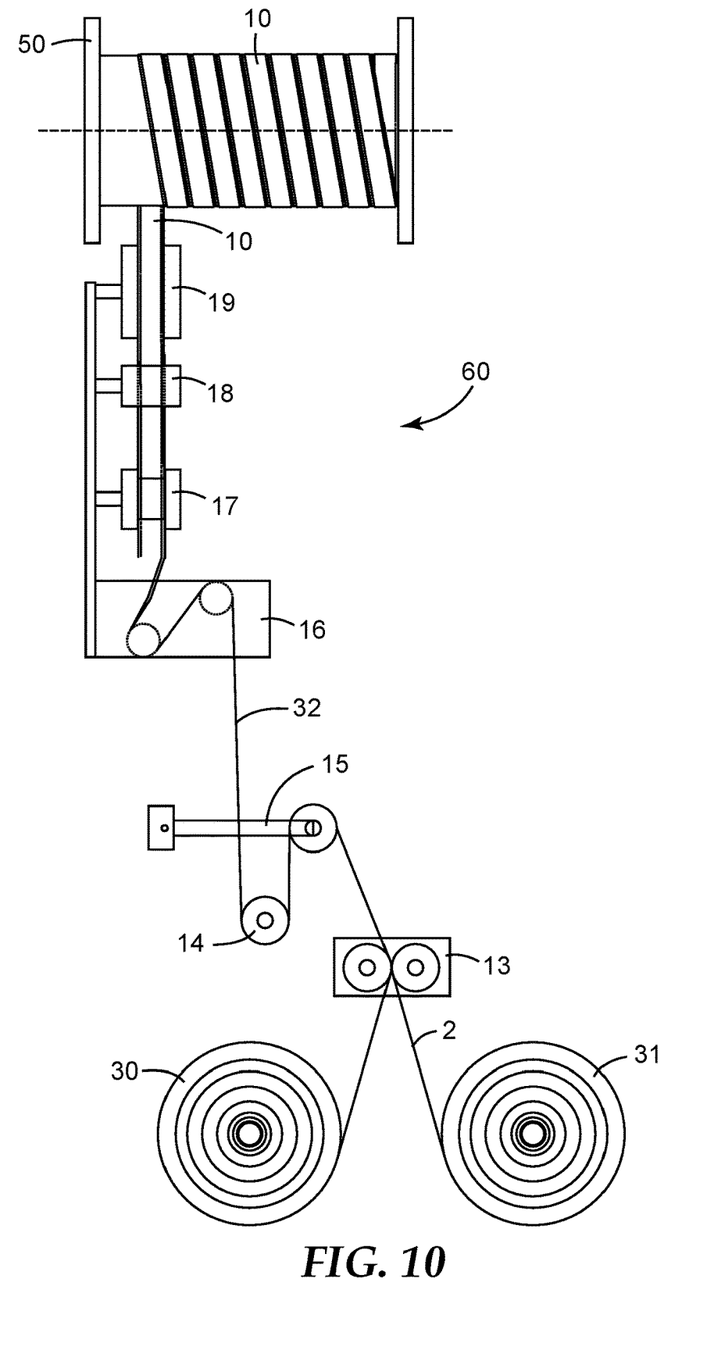
FIG. 10 is a partial schematic view of an apparatus being able to perform the method for making a roll of an adhesive tape according to the invention.

FIG. 10 is a schematic view method of making a roll of structural adhesive tape in which structural adhesive film is wrapped and laminated. The structural adhesive tape 30 comprises first liner 1 and adhesive film 3. They are unwound from first roll and cut on the required width. The second liner 2 is unwound from the second roll 31. The first liner 1 with the adhesive film 3 and the second liner 2 are provided to the lamination unit 13 where the second liner 2 is laminated with second major adhesive surface 4. The tape 32 is processed along a tension sensing roller 14, 15 and then around a idler roller block 16 which is non driven tape leading roller block. The roller block leads tape 32 to the next step of the process. The structural adhesive tape 32 is further processed processing along segments of blocks 17, 18, 19 in which the second liner 2 is wrapped around the edges of the first liner 1. After wrapped the second liner 2 the structural adhesive tape 10 is level-wound around the core 50 in essentially helical convolutions.

EXAMPLES

The following test methods have been used in the above specification and/or in the examples provided below.
Test Methods
1. Cold Flow The cold flow is the permanent deformation of a tape under constant stress at room temperature which is not reversible when removing the pressure. The cold flow for a tape appears as a tape surface and/or tape edge damage, respectively.

The constant stress can be applied by winding the tape into a roll and maintaining it at room temperature for a predetermined time in the roll form. The cold flow is then qualitatively assessed by comparing the second major surface of the tape prior to winding it into a roll and after unwinding it, respectively. Qualitative tape testing for cold flow includes:

- comparison of the width of the second major surfaces of the tape prior to winding and subsequent to unwinding, respectively
- visual inspection of the second major adhesive surfaces of the tape prior to winding and subsequent to unwinding, respectively
- visual inspection of the second minor surfaces of the adhesive tape and the edges they form with the first and second major adhesive surfaces, respectively, prior to winding and subsequent to unwinding, respectively.

A tape width defect appears mainly as: "structural adhesive film" width extending over the first liner edge, and it is checked by comparing width of a first liner and width of a structural adhesive film. Tape surface defect appear mainly as: air traps holes, film brakes, scratches and wrinkles as results in poor adhering between the structural adhesive film second major surface and second liner. Structural adhesive film edge should stay even and smooth, edge fuzz are treated as cold flow defect.

For a quantitative measurement the adhesive tape having a width of 15 mm is wound around a core into a roll of adhesive tape. The tape length is 500 m and the pressure in the roll is max 5 N. The dimensions of the core are max 400 diameter, and the lateral speed of the roll applied during winding is 100 m/min. The adhesive tape is stored at room temperature in the roll form for a time of maximum 6 months and subsequently unwound.

The cold flow behavior of the adhesive tape is quantitatively defined as the difference of the width $w_{initial}$ of the second major adhesive surface of the adhesive tape in CD prior to winding it into a roll and the width $w_{unwound}$ of the second major adhesive surface of the adhesive tape in CD after unwinding it from the roll, divided by the width $w_{initial}$ of the second major adhesive surface of adhesive tape in CD prior to winding it into a roll $$CF=(w_{initial}-w_{unwound})/w_{initial}$$

CF is reported as a dimensionless number. MD means machine direction and corresponds to the direction of the length of the tape. CD means cross-direction and is normal to MD.

2. Product Density: Test Method ASTM D792-08

These test methods describe the determination of the specific gravity (relative density) and the density of solid plastics in forms such as sheets, rods, tubes, or molded items.

Test Method B

This test method is used for testing solid plastics specimens in liquids other than water using one-piece specimens with a mass of between 1 to 50 g, and it is applied to plastics that are affected by water or are lighter than water. The test specimen shall be a single piece of material with a size and shape suitable for the testing apparatus, provided that its volume shall be not less than 1 cm$^3$ and its surface and edges shall be made smooth. The thickness of the specimen shall be at least 1 mm for each 1 g of weight. A specimen mass of between 1 to 5 g was found to be convenient.

3. Melt Flow Rate Index: Test Method ASTM D1238-10

This test method covers the determination of the rate of extrusion of molten thermoplastic resins using an extrusion plastometer. After a specified preheating time, the resin is extruded through a die with a specified length and orifice diameter under prescribed conditions of temperature, load, and piston position in the barrel.

Procedure A is used to determine the melt flow rate (MHO of a thermoplastic material. The units of measure are grams of material/10 minutes (g/10 min). It is based on the measurement of the mass of material that extrudes from the die over a given period of time. It is generally used for materials having melt flow rates that fall between 0.15 and 50 g/10 min Standard conditions of test method: 190° C. and 2.16 kg weight 4. Tensile Strength at Break: Test Method ASTM D882-12

This test method covers the determination of tensile properties of plastics in the form of thin sheeting and films (less than 1.0 mm (0.04 in.) in thickness). Tensile properties determined by this test method are of value for the identification and characterization of materials for control and specification purposes.

Standard conditions of test method: The speed of testing shall be maintained within 500 mm/min, sample thickness: 20 µm and 51 µm.

5. Brittle Transition Temperature: Test Method ASTM D746-07

This test method covers the determination of the temperature at which plastics and elastomers exhibit brittle failure under specified impact conditions. To determine the brittleness temperature, specimens are secured to a specimen holder with a torque wrench. The specimen holder is immersed in a bath containing a heat transfer medium that is cooled. The specimens are struck at a specified linear speed and then examined. The brittleness temperature is defined as the temperature at which 50% of the specimens fail.

6. Film Thickness: Test Method ASTM D1005-95

This test method covers the measurement of film thickness of dried films of paint, varnish, lacquer, and related products using micrometers.

Procedure B—Stationary micrometer for measuring free films.

7. Surface Free Energy: Test Method ASTM D2578-09

Surface Tension (Surface free energy) is measured with a tensiometer or by capillary rise. Surface energies of plastics are determined indirectly by observing the angel of contact of a graded series of increasingly polar liquids of know surface tension on the plastic surface, then applying regression analysis to determine the polar and non-polar component of surface energy.

Example 1

An adhesive tape is provided comprising an structural adhesive film which compound bisphenol A/epichlorohydrin, phenol 4,4'-(1-methylethylidene)bispolymer with (chloromethyl) oxirane, copolymer MBS, expanded volcanic rock, 1-cyanoguanidne, methylene diphenyl bis, thermo-expandable microcapsules with 2-methylbutane, glass beads that is attached to a first liner made of paper. The first liner has a thickness of 600 µm. The adhesive tape has a width in CD of 15 mm and a length in MD of 200 m.

The adhesive tape is level-wound into a roll applying a second liner to the second adhesive surface in an essentially symmetric fashion as is schematically shown in FIGS. 2 and 3. The width of the second liner is larger than the sum of the width of the second major adhesive surface and the width of the two minor second adhesive surfaces, and the overshooting portions of the second liners are each bent outwardly as is schematically shown in FIGS. 2 and 3. The second liner consists of liner low density polyethylene resin and has a width of 18 mm. Other properties of the second liner are: brittle transition temperature −60° C., product density 0,918 g/cm$^3$, melt flow rate 0.9 g/10 min, tensile strength at break 40-47 MPA.

A short sample of the adhesive tape with a length in MD of about 5-10 cm is cut off from the adhesive tape and stored under non-pressurized ambient conditions. The remainder of the adhesive tape is wound on a core having the following dimensions. The lateral speed in CD during winding providing a level-wound roll is 100 m/min. The pressure within the roll is 2 N.

The adhesive tape is kept in roll form for 1 month at room temperature.

After this the adhesive tape is unwound from the roll, and the unwound adhesive tape is compared with the sample of the adhesive cut from the adhesive tape before winding it in a roll, both qualitatively and quantitatively.

The qualitative assessment shows that the second major adhesive surface of the tape wound into a roll and unwound again does essentially not differ from the second major adhesive surface of the unpressurized cut-off sample. The second major adhesive surface of the adhesive tape subsequent to unwinding is essentially free of air traps holes, film brakes, scratches and wrinkles, and it furthermore is smooth and dopes not exhibit edge fuzz.

A quantitative evaluation shows that the cold flow CF that was measured as describe above is less than +/−5.

Comparative Example 1

Example 1 was repeated with the difference that the second liner was omitted the edges of structural adhesive film so that the second adhesive surface was able to flow between first and second liner during winding and storage.

The appearance and the dimensions of the adhesive tape subsequent to unwinding are qualitatively and quantitatively compared with the corresponding properties of the sample that was cut off from the tape prior to winding and that was not pressurized.

The qualitative assessment shows that the second major adhesive surface of the tape wound into a roll and unwound again. In this case the tape wound into a roll showed characteristics of cold flow. The roll appearance doesn't comply with the product specification. The major adhesive surface of the structural adhesive tape is destroyed. The edges of structural adhesive tape are uneven and interruptions can be observed in the major adhesive surfaces of the structural adhesive film.

A quantitative evaluation shows that the cold flow CF that was measured as describe above is more than 5%.

The invention claimed is:

1. Roll of a double-sided adhesive tape wound around a core, said tape comprising first and second major adhesive surfaces and first and second minor surfaces, with at least one adhesive layer comprising a structural adhesive providing said second major adhesive surface,
   the first major adhesive surface being protected by a first liner;
   the second major adhesive surface having opposite edges and being protected by a second liner, and
   the second liner extending over the opposite edges of the second major adhesive surface so as to cover at least part of each first and second minor surfaces of the tape.

2. The roll according to claim 1, wherein each of said first and second major adhesive surfaces is provided by a structural adhesive.

3. The roll according to claim 1, wherein the second liner covers each of the first and second minor surfaces of the adhesive layer comprising the structural adhesive.

4. The roll according to claim 1, wherein the second liner extends beyond the ends of each of the first and second minor surfaces of the tape and is folded onto said first liner.

5. The roll according to claim 1, wherein the adhesive tape is level-wound around said core in essentially helical convolutions or the adhesive tape is wound around said core into a planetary roll.

6. The roll according to claim 5, wherein the tape on the roll with the first and second liner has length of at least 200 m.

7. The roll according to claim 1, wherein the first liner has a width not exceeding the width of the first major adhesive surface.

8. The roll according to claim 1, wherein the first liner is non-stretchable.

9. The roll according to claim 1, wherein the first liner is made of paper, polyester and/or polyamide.

10. The roll according to claim 1, wherein the second liner is stretchable.

11. The roll according to claim 1, wherein the second liner is a thermoplastic film with a thickness below 30 μm and/or a brittle transition temperature below 40° C.

12. The roll according to claim 1, characterized in that the second liner comprises a material selected from a group comprising low density polyethylene (LDPE), linear low density polyethylene (LLDPE), ultra low density polyethylene (ULDPE), enhanced polyethylene resin (EPE), polyvinyl chloride (PVC), ethylene-vinyl acetate copolymer (EVA), stretched polyethylene, oriented polypropylene films, ethylene/acid copolymer (EAA), poly(ethylene-vinyl-alcohol), and/or copolymers of ethylene with minor amounts of at least one C4 to C10 alpha-olefin co-monomer.

13. The roll according to claim 1, wherein the second liner has density between 0.9-0.94 g/cm$^3$.

14. The roll according to claim 1, wherein the second liner has a melt flow rate not greater than 6 g/10 min.

15. The roll according to claim 1, wherein the second liner has a tensile strength at break of greater than 20 MPa.

16. The roll according to claim 1, wherein the second liner has a surface free energy below 40 mN/m at 20° C.

17. The roll according to claim 1, wherein the structural adhesive comprises a thermosettable adhesive comprising at least one thermally activatable epoxy compound and at least one epoxy curing agent.

18. The roll according to claim 1, wherein the tape has a shelf-life time of at least 6 months.

19. The roll according to claim 1, wherein each major surface has opposite edges and each edge forms a transition from one major surface to one minor surface, each liner comprises opposite liner major surfaces and opposite liner minor surfaces, the second liner has two end portions extending beyond the opposite edges of the second major adhesive surface, and each end portion covers the first and second minor surfaces of the tape, and each end portion covers one minor surface of the first liner.

20. Method of making the roll of double-sided adhesive tape of claim 1, said method comprising the steps of:
   providing said adhesive tape,
   attaching a first liner to the first major surface of the tape,
   attaching a second liner to the second major surface and at least part of each first and second minor surfaces of the tape and
   winding the tape round a core.

* * * * *

UNITED STATES PATENT AND TRADEMARK OFFICE
CERTIFICATE OF CORRECTION

PATENT NO. : 10,533,118 B2
APPLICATION NO. : 14/895327
DATED : January 14, 2020
INVENTOR(S) : Tomasz Wikierak et al.

It is certified that error appears in the above-identified patent and that said Letters Patent is hereby corrected as shown below:

In the Specification

Column 5
Line 10, delete "and" and insert -- and, --, therefor.
Line 33, delete "0,918" and insert -- 0.918 --, therefor.

Column 6
Line 16, delete "guainidenes," and insert -- guanidines, --, therefor.

Column 11
Line 25, delete "(MHO" and insert -- (MFR) --, therefor.
Line 65, delete "capilliary" and insert -- capillary --, therefor.

Column 12
Line 11, delete "1-cyanoguanidne," and insert -- 1-cyanoguanidine, --, therefor.
Line 26, delete "0,918" and insert -- 0.918 --, therefor.

In the Claims

Column 14
Line 44, in Claim 20, delete "round" and insert -- around --, therefor.

Signed and Sealed this
Fifteenth Day of September, 2020

Andrei Iancu
*Director of the United States Patent and Trademark Office*